US012380637B2

(12) United States Patent
Teranishi et al.

(10) Patent No.: US 12,380,637 B2
(45) Date of Patent: Aug. 5, 2025

(54) THREE-DIMENSIONAL MODEL GENERATION METHOD AND THREE-DIMENSIONAL MODEL GENERATION DEVICE FOR CALCULATING AN ACCURACY OF A SIMILAR POINT SEARCH

(71) Applicant: Panasonic Intellectual Property Management Co., Ltd., Osaka (JP)

(72) Inventors: Kensho Teranishi, Osaka (JP); Satoshi Yoshikawa, Hyogo (JP); Toru Matsunobu, Osaka (JP); Masaki Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 17/943,479

(22) Filed: Sep. 13, 2022

(65) Prior Publication Data
US 2023/0005216 A1 Jan. 5, 2023

Related U.S. Application Data

(63) Continuation of application No. PCT/JP2021/012093, filed on Mar. 23, 2021.

(30) Foreign Application Priority Data

Mar. 27, 2020 (JP) .................................. 2020-058979

(51) Int. Cl.
*G06T 17/00* (2006.01)
*G06V 10/44* (2022.01)
(Continued)

(52) U.S. Cl.
CPC .............. *G06T 17/00* (2013.01); *G06V 10/44* (2022.01); *G06V 10/761* (2022.01); *G06V 10/98* (2022.01)

(58) Field of Classification Search
None
See application file for complete search history.

(56) References Cited

U.S. PATENT DOCUMENTS 6,647,146 B1 * 11/2003 Davison .................. G06T 7/564
358/1.9
8,072,448 B2 * 12/2011 Zhu .......................... G06T 19/00
715/848

(Continued)

FOREIGN PATENT DOCUMENTS

EP 3 182 369 6/2017
JP 2000-171214 6/2000
(Continued)

OTHER PUBLICATIONS

International Search Report (ISR) issued on Jun. 22, 2021 in International (PCT) Application No. PCT/JP2021/012093.
(Continued)

*Primary Examiner* — Jason A Pringle-Parker
(74) *Attorney, Agent, or Firm* — Wenderoth, Lind & Ponack, L.L.P.

(57) ABSTRACT

A three-dimensional model generation method executed by an information processing device includes: obtaining images generated by shooting a subject from respective viewpoints; searching for a similar point that is similar to a first point in a first image among the images, from second points in a search area in a second image different from the first image, the search area being provided based on the first point; calculating an accuracy of a search result of the searching, using degrees of similarity between the first point and the
(Continued)

respective second points; and generating a three-dimensional model using the search result and the accuracy.

12 Claims, 11 Drawing Sheets

(51) Int. Cl.
*G06V 10/74* (2022.01)
*G06V 10/98* (2022.01)

(56) References Cited

U.S. PATENT DOCUMENTS

| | | | |
|---|---|---|---|
| 2005/0074162 A1* | 4/2005 | Tu | G06T 7/80 |
| | | | 382/154 |
| 2014/0293016 A1* | 10/2014 | Benhimane | G06T 7/246 |
| | | | 348/50 |
| 2015/0235378 A1* | 8/2015 | Rhee | G06T 19/006 |
| | | | 382/164 |
| 2015/0317821 A1* | 11/2015 | Ding | G06T 7/60 |
| | | | 345/420 |
| 2015/0363971 A1* | 12/2015 | Pan | G06T 7/593 |
| | | | 345/420 |
| 2018/0124380 A1* | 5/2018 | Berthilsson | G06T 7/74 |
| 2021/0358157 A1 | 11/2021 | Ohnishi et al. | |

FOREIGN PATENT DOCUMENTS

| | | |
|---|---|---|
| JP | 2014-102805 | 6/2014 |
| JP | 2017-130146 | 7/2017 |
| WO | 2019/160032 | 8/2019 |

OTHER PUBLICATIONS

Extended European Search Report issued Apr. 13, 2023 in corresponding European Patent Application No. 21775312.8.
Neill D.F. Campbell et al., "Using Multiple Hypotheses to Improve Depth-Maps for Multi-View Stereo", 16th European Conference—Computer Vision—ECCV 2020, Oct. 2008, pp. 766-779.
Jianguo Li et al., "Bundled Depth-Map Merging for Multi-View Stereo", 2010 IEEE Conference on Computer Vision and Pattern Recognition (CVPR), San Francisco, CA, USA, IEEE, Piscataway, NJ, USA, Jun. 2010, pp. 2769-2776.
Xiaoyan Hu et al., "A Quantitative Evaluation of Confidence Measures for Stereo Vision", IEEE Transactions on Pattern Analysis and Machine Intelligence, IEEE Computer Society, USA, vol. 34, No. 11, Nov. 2012, pp. 2121-2133.

* cited by examiner

FIG. 4
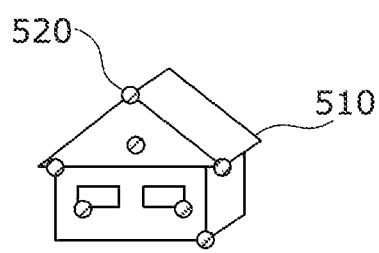
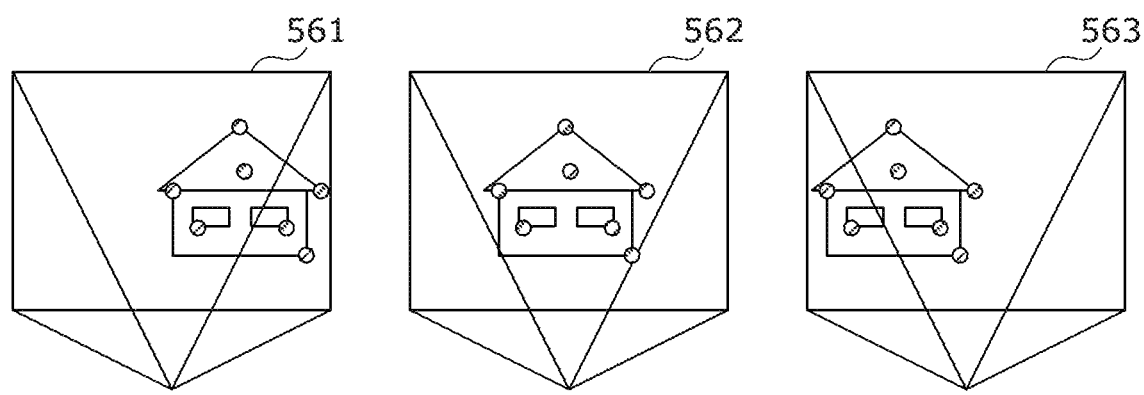

THREE-DIMENSIONAL MODEL GENERATION METHOD AND THREE-DIMENSIONAL MODEL GENERATION DEVICE FOR CALCULATING AN ACCURACY OF A SIMILAR POINT SEARCH

CROSS REFERENCE TO RELATED APPLICATIONS

This is a continuation application of PCT International Application No. PCT/JP2021/012093 filed on Mar. 23, 2021, designating the United States of America, which is based on and claims priority of Japanese Patent Application No. 2020-058979 filed on Mar. 27, 2020. The entire disclosures of the above-identified applications, including the specifications, drawings and claims are incorporated herein by reference in their entirety.

FIELD

The present disclosure relates to a three-dimensional model generation method and a three-dimensional model generation device.

BACKGROUND

Patent Literature (PTL) 1 discloses a technique of generating a three-dimensional model of a subject, using images obtained by shooting the subject from a plurality of viewpoints.

CITATION LIST

Patent Literature

PTL 1: Japanese Unexamined Patent Application Publication No. 2017-130146

SUMMARY

Technical Problem

In the generating of three-dimensional models, there is a demand for improving three-dimensional model generation accuracy.

The present disclosure provides a three-dimensional model generation method, and so on, capable of improving three-dimensional model generation accuracy.

Solution to Problem

A three-dimensional model generation method according to an aspect of the present disclosure is a three-dimensional model generation method executed by an information processing device, and includes: obtaining images generated by shooting a subject from respective viewpoints; searching for a similar point that is similar to a first point in a first image among the images, from second points in a search area in a second image different from the first image, the search area being provided based on the first point; calculating an accuracy of a search result of the searching, using degrees of similarity between the first point and the respective second points; and generating a three-dimensional model of the subject using the search result and the accuracy.

A three-dimensional model generation device according to an aspect of the present disclosure includes: memory; and a processor, wherein using the memory, the processor: obtains images generated by shooting a subject from respective viewpoints; searches for a similar point that is similar to a first point in a first image among the images, in a search area in a second image different from the first image, the search area being provided based on the first point; calculates an accuracy of a three-dimensional point generated based on the first point, using degrees of similarity between the first point and respective second points in the search area; and generates a three-dimensional model of the subject using a result of the search and the accuracy.

It should be noted that the present disclosure may be implemented as a program that causes a computer to execute the steps included in the three-dimensional model generation method described above. Furthermore, the present disclosure may be implemented as a non-transitory computer-readable recording medium, such as a CD-ROM, having the above program recorded thereon. Furthermore, the present disclosure may be implemented as information, data, or signal representing the above program. In addition, the program, information, data, and signal may be distributed via a communication network such as the Internet.

Advantageous Effects

A three-dimensional model generation method, and so on according to the present disclosure can improve generation accuracy of three-dimensional models.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram illustrating a relationship between a subject and frames.

Figure 1:
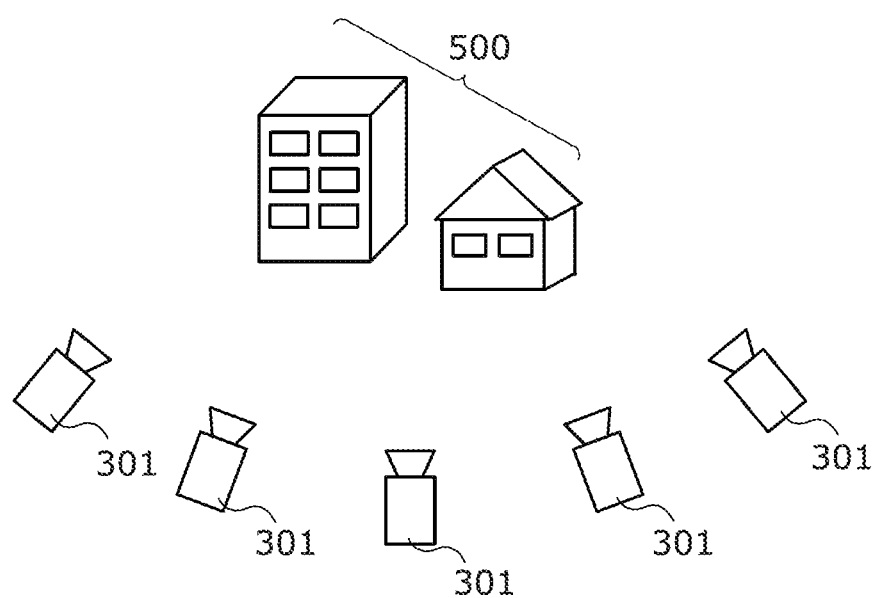
FIG. 1 is a diagram for describing an outline of a three-dimensional model generation method according to an embodiment.

DESCRIPTION OF EMBODIMENTS (Circumstances Leading to the Present Disclosure)

In the technique disclosed in PTL 1, a three-dimensional model is generated by searching for a similar point between images. Typically, in the searching of a similar point, when a similar point of a single pixel in a single image is searched for from another image, an epipolar line on the other image is calculated from a geometric constraint of a camera, and searching for a plurality of pixels on the epipolar line is performed. However, there is the problem that search accuracy deteriorates when a plurality of pixels that are similar to a single pixel are present on the epipolar line, such as in the case where the same textures are lined up on the epipolar line.

In view of this, the present disclosure provides a three-dimensional model generation method, and so on, that can improve generation accuracy of three-dimensional models.

A three-dimensional model generation method according to an aspect of the present disclosure is a three-dimensional model generation method executed by an information processing device, and includes: obtaining images generated by shooting a subject from a plurality of viewpoints; searching for a similar point that is similar to a first point in a first image among the images, from second points in a search area in a second image different from the first image, the search area being based on the first point; calculating an accuracy of a search result, using degrees of similarity each between the first point and a different one of the second points; and generating a three-dimensional model of the subject using the search result and the accuracy.

According to this method, since the three-dimensional model is generated using search results and accuracies of the search results, the accuracy of generation of the three-dimensional model can be improved by avoiding using search results with lower accuracies or by preferentially using search results with higher accuracies for generating the three-dimensional model, for example.

Furthermore, in the searching, the similar point may be searched for in each of second images, each of the second images being the second image. In the calculating of the accuracy, a first accuracy may be calculated for each of first search results corresponding to a different one of the second images. In the generating of the three-dimensional model, the three-dimensional model may be generated using the first search results and the first accuracies.

According to this method, since the three-dimensional model is generated using a plurality of first search results and a plurality of first accuracies, three-dimensional points with higher accuracies can be generated by avoiding using first search results with lower accuracies or by preferentially using first search results with higher accuracies for generating the three-dimensional model, for example. Therefore, the accuracy of generation of the three-dimensional model can be improved.

Furthermore, in the generating of the three-dimensional model, the three-dimensional model may be generated without using the first search result for a second image for which the first accuracy calculated is lower than a predetermined accuracy.

According to this method, since a first search result with an accuracy lower than the predetermined threshold is not used for generating the three-dimensional model, three-dimensional points with higher accuracies can be generated.

Furthermore, the generating of the three-dimensional model may include: selecting, from among the second images, N second images in a descending order of the first accuracy calculated (where N is an integer greater than or equal to 1); and generating the three-dimensional model using N first search results corresponding to the N second images selected.

According to this method, since N first search results with higher accuracies are preferentially used for generating the three-dimensional model, three-dimensional points with higher accuracies can be generated.

Furthermore, the generating of the three-dimensional model may include: generating, based on the first search results, three-dimensional points each of which corresponds to a different one of the first search results; generating an integrated three-dimensional point by weighted averaging of the three-dimensional points in which a greater weight is given to a three-dimensional point having a corresponding first search result with a higher first accuracy; and generating the three-dimensional model including the integrated three-dimensional point generated.

According to this method, since an integrated three-dimensional point is generated by weighted averaging of three-dimensional points generated using the first search results in which a greater weight is given to a three-dimensional point with a higher accuracy, three-dimensional points with higher accuracies can be generated.

Furthermore, the searching may be performed for each of first points, each of the first points being the first point. In the calculating of the accuracy, the first accuracies may be calculated for each of the first points. In the generating of the three-dimensional model, a three-dimensional model including three-dimensional points obtained by generating, for each of the first points, a three-dimensional point using the first search results and the first accuracies may be generated as the three-dimensional model.

Therefore, a three-dimensional point with a higher accuracy can be generated for each of the first points. Therefore, the accuracy of generation of the three-dimensional model can be improved.

Furthermore, the calculating of the accuracy may include calculating, for each of the first points, a sum of values indicating the first accuracies calculated for the first point, as a second accuracy of a search result based on the first point. In the generating of the three-dimensional model, a three-dimensional model including the three-dimensional points and the second accuracies corresponding to the three-dimensional points may be generated as the three-dimensional model.

Therefore, each of the three-dimensional points included in the three-dimensional model can be associated with a second accuracy that is based on the first accuracies of the search results used when generating the three-dimensional point.

Furthermore, the generating of the three-dimensional model may include correcting at least one low-accuracy three-dimensional point located between two high-accuracy three-dimensional points using the two high-accuracy three-dimensional points as reference, the at least one low-accuracy three-dimensional point being associated with a second accuracy lower than a predetermined accuracy, the two high-accuracy three-dimensional points each being associated with a second accuracy higher than the predetermined accuracy.

According to this method, low-accuracy three-dimensional points can be corrected with respect to high-accuracy three-dimensional points by permitting a greater displacement for correction for a three-dimensional point with a lower accuracy, for example, and therefore, the accuracy of generation of the three-dimensional model can be improved.

Furthermore, the search area may be an area defined by pixels on an epipolar line corresponding to the first point.

Therefore, a candidate for a pixel similar to the first pixel can be efficiently selected from among the second pixels.

A three-dimensional model generation device according to an aspect of the present disclosure includes memory and a processor. Using the memory, the processor: obtains images generated by shooting a subject from a plurality of viewpoints; searches for a similar point that is similar to a first point in a first image among the images, in a search area in a second image different from the first image, the search area being based on the first point; calculates an accuracy of a three-dimensional point generated based on the first point, using degrees of similarity each between the first point and a different one of second points in the search area; and generates a three-dimensional model of the subject using a result of the search and the accuracy.

According to this method, since the three-dimensional model is generated using search results and accuracies of the search results, the accuracy of generation of the three-dimensional model can be improved by avoiding using search results with lower accuracies or by preferentially using search results with higher accuracies for generating the three-dimensional model, for example.

Hereinafter, respective embodiments of a three-dimensional model generation method, etc., according to the present disclosure will be described in detail with reference to the drawings. It should be noted that each of the subsequently described embodiments shows a specific example of the present disclosure. Accordingly, numerical values, shapes, structural components, the arrangement and connection of the structural components, steps, and the processing order of the steps, etc., shown in each of the following embodiments are merely examples, and are therefore not intended to limit the scope of the present disclosure.

Furthermore, the respective figures are not necessarily precise illustrations. In the figures, structural components that are substantially the same are assigned the same reference signs, and overlapping description thereof may be omitted or simplified.

Embodiment

[Outline]

First, referring to FIG. 1, the outline of a three-dimensional model generation method according to an embodiment will be described.

Figure 2:
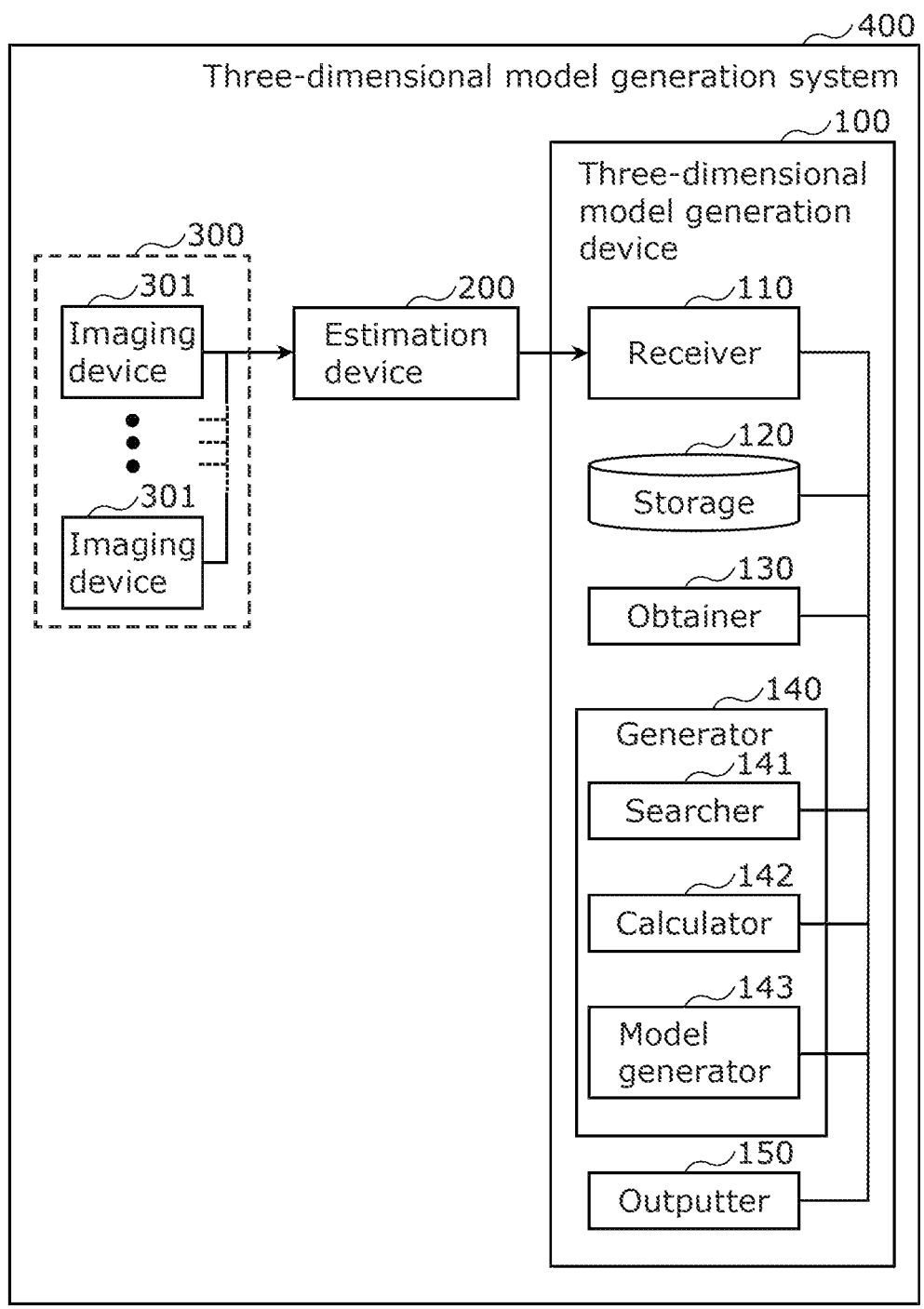
FIG. 2 is a block diagram illustrating the characteristic configuration of a three-dimensional model generation device according to the embodiment.

FIG. 1 is a diagram for describing the outline of the three-dimensional model generation method according to an embodiment. FIG. 2 is a block diagram illustrating the characteristic configuration of three-dimensional model generation device 100 according to the embodiment.

In the three-dimensional model generation method, as illustrated in FIG. 1, the three-dimensional model of a predetermined region is generated from a plurality of images shot from a plurality of different viewpoints using a plurality of imaging devices 301. Here, the predetermined region is a region including a stationary static object or a moving body such as a person, or the both. In other words, the predetermined region is a region including, for example, at least one of a stationary static object or a moving body as a subject.

As an example of the predetermined region including a static object and an animal body, there is a venue where a sport game such as a basketball game is being held, a space on a road where a person or a vehicle exists, or the like. Note that the predetermined region may include not only a specific object to be used as a subject, but also scenery, etc.

FIG. 1 illustrates a case where subject 500 is a building. Additionally, hereinafter, the predetermined region including not only a specific object to be used as a subject, but also scenery, etc. is also simply called the subject.

As illustrated in FIG. 2, three-dimensional model generation system 400 includes imaging device group 300 including a plurality of imaging devices 301, estimation device 200, and three-dimensional model generation device 100.

(Imaging devices)

Imaging devices 301 are imaging devices that shoot a predetermined area. Each of imaging devices 301 shoots a subject, and outputs each of a plurality of shot frames to estimation device 200. In Embodiment 1, two or more imaging devices 301 are included in imaging device group 300. Additionally, imaging devices 301 shoot the same subject from a plurality of mutually different viewpoints. A frame is, in other words, an image.

Note that, although it has been assumed that three-dimensional model generation system 400 includes imaging device group 300, three-dimensional model generation system 400 is not limited to this, and may include one imaging device 301. For example, in three-dimensional model generation system 400, while moving one imaging device 301, the one imaging device 301 may be caused to generate, for a subject that exists in a real space, a multi-viewpoint image formed from a plurality of frames having mutually different viewpoints. The plurality of frames are frames shot (generated) with imaging devices 301 that differ from each other in at least one of the positions or orientations of imaging devices 301, respectively.

Additionally, each imaging device 301 may be an imaging device that generates a two-dimensional image, or an imaging device with a three-dimensional measuring sensor that generates a three-dimensional model. In the present embodiment, each of imaging devices 301 is an imaging device that generates a two-dimensional image.

Each of imaging devices 301 may be directly connected to estimation device 200 by wired communication or wireless communication, so as to be able to output the shot frames to estimation device 200, or may be indirectly connected to estimation device 200 via a hub, such as a communication equipment or a server, which is not illustrated.

Note that the frames shot with imaging devices 301, respectively, may be output to estimation device 200 in real time. Additionally, after the frames are once recorded in external storage devices, such as a memory or a cloud server, the frames may be output from these external storage devices to estimation device 200.

Additionally, imaging devices 301 may be fixed cameras such as surveillance cameras, respectively, may be mobile cameras such as video cameras, smart phones, or wearable cameras, or may be moving cameras such as drones with a shooting function.

(Estimation Device)

Estimation device 200 performs camera calibration by causing one or more imaging devices 301 to shoot a subject from a plurality of viewpoints. Estimation device 200 performs the camera calibration that estimates the positions and orientations of imaging devices 301 based on, for example, a plurality of frames shot with imaging devices 301. Here, the orientation of imaging device 301 indicates at least one of the shooting direction of imaging device 301, or the inclination of imaging device 301. The shooting direction of imaging device 301 is the direction of the optical axis of imaging device 301. The inclination of imaging device 301 is the rotation angle around the optical axis of imaging device 301 from a reference orientation.

Specifically, estimation device 200 estimates camera parameters of imaging devices 301, based on a plurality of frames obtained from imaging devices 301. Here, the camera parameters are parameters that indicates the characteristics of imaging devices 301, and are a plurality of parameters that includes internal parameter including a focal point distance, an image center, etc. of imaging device 301, and external parameters indicating the position (more specifically, three-dimensional position) and orientation of imaging device 301. That is, the position and orientation of each of imaging devices 301 are obtained by estimating respective camera parameters.

Note that the estimation method of estimating, by estimation device 200, the positions and orientations of imaging devices 301 is not particularly limited. Estimation device 200 may estimate the positions and orientations of imaging devices 301 by using, for example, the Visual-SLAM (Simultaneous Localization and Mapping) technology. Alternatively, estimation device 200 may estimate the positions and orientations of imaging devices 301 by using, for example, the Structure-From-Motion technology.

Here, a method of estimating positions and orientations of imaging devices 301 by estimation device 200 will be described using FIG. 3.

Estimation device 200 performs searching for feature points by extracting characteristic points from frames 531 to 533 shot with imaging devices 301 as feature points, respectively, by using the Visual-SLAM technology or the Structure-From-Motion technology, and extracts a set of similar points that are similar between a plurality of frames among the extracted feature points. Since estimation device 200 can identify a point on subject 510 reflected in common in frames 531 to 533 by performing the searching for feature points, the three-dimensional coordinates of the point on subject 510 can be obtained with the principle of triangulation by using the set of the extracted similar points.

In this manner, estimation device 200 can estimate the position and orientation of each imaging device 301 by extracting a plurality of sets of similar points, and using the sets of similar points. In the process of estimating the position and orientation of each imaging device 301, estimation device 200 calculates three-dimensional coordinates for each set of similar points, and generates three-dimensional model 520 including a plurality of three-dimensional points indicated by the plurality of calculated three-dimensional coordinates. Each of the plurality of three-dimensional points indicates the position on subject 510 in the three-dimensional space. Estimation device 200 obtains, as estimation results, the position and orientation of each imaging device 301, and the map information. Since the obtained three-dimensional model 520 is processed for optimization with the camera parameters, the obtained three-dimensional model 520 is information with higher accuracy than predetermined accuracy. Additionally, three-dimensional model 520 includes the three-dimensional position of each of the plurality of three-dimensional points. Note that three-dimensional model 520 may include not only the plurality of three-dimensional positions, but also the color of each three-dimensional point, the surface shape around each three-dimensional point, information indicating the frame from which each three-dimensional point is generated, etc.

Additionally, in order to increase the speed of the estimation processing, estimation device 200 may generate three-dimensional model 520 including a sparse three-dimensional point cloud by limiting the number of sets of similar points to a predetermined number. Because estimation device 200 can estimate the position and orientation of each imaging device 301 with sufficient accuracy, even with the predetermined number of sets of similar points. Note that the predetermined number may be determined to be a number with which the position and orientation of each imaging device 301 can be estimated with sufficient accuracy. Additionally, estimation device 200 may estimate the position and orientation of each imaging device 301 by using sets that are similar at or above a predetermined degree of similarity among the sets of similar points. As a result, estimation device 200 can limit the number of sets of similar points used for the estimation processing to the number of sets that are similar at or above the predetermined similarity.

Additionally, based on, for example, the position and orientation of imaging device 301 estimated by using the above-described technology, estimation device 200 may calculate the distance between imaging device 301 and subject 510 as a camera parameter. Note that three-dimensional model generation system 400 may include a distance measurement sensor, and the distance between imaging device 301 and subject 510 may be measured by using the distance measurement sensor.

Estimation device 200 may be directly connected to three-dimensional model generation device 100 by wired communication or wireless communication, or may be indirectly connected to estimation device 200 via a hub, such as a communication equipment or a server, which is not illustrated. Accordingly, estimation device 200 outputs a plurality of frames received from imaging devices 301, and a plurality of estimated camera parameters of imaging devices 301 to three-dimensional model generation device 100.

Note that the camera parameters estimated by estimation device 200 may be output to three-dimensional model generation device 100 in real time. Additionally, after the camera parameters are once recorded in external storage devices, such as a memory or a cloud server, the camera parameters may be output from these external storage devices to three-dimensional model generation device 100.

Estimation device 200 includes at least a computer system that includes, for example, a control program, a processing circuit such as a processor or a logical circuit that executes the control program, and a recording device such as an internal memory or an accessible external memory storing the control program.

(Three-Dimensional Model Generation Device)

Three-dimensional model generation device 100 generates the three-dimensional model of a predetermined area, based on a plurality of frames shot with imaging devices 301, and camera parameters estimated by estimation device 200. Specifically, three-dimensional model generation device 100 is a device that performs three-dimensional model generation processing that generates the three-dimensional model of a subject in a virtual three-dimensional space, based on the respective camera parameters of imaging devices 301, and the plurality of frames.

Note that the three-dimensional model of the subject is data including the three-dimensional shape of the subject and the color of the subject that are restored in the virtual three-dimensional space from the frames obtained by shooting the actual subject. The three-dimensional model of the subject is a set of points indicating the respective three-dimensional positions of a plurality of points on the subject reflected to each of a plurality of two-dimensional images shot with a plurality of imaging devices 301 from multiple viewpoints, that is, a plurality of different viewpoints.

A three-dimensional position is represented by, for example, three-value information formed from a X component, a Y component, and a Z component that indicate the positions on an X-axis, a Y-axis, and a Z-axis that are orthogonal to each other, respectively. Note that the information included in a plurality of points indicating three-dimensional positions may include not only the three-dimensional positions (that is, information indicating coordinates), but also information indicating the color of each point, information representing the surface shapes of each point and its surrounding, etc. In this manner, the information on three-dimensional positions includes information other than information on an imaging viewpoint of a frame and the distance from the subject.

Three-dimensional model generation device 100 includes at least a computer system that includes, for example, a control program, a processing circuit such as a processor or a logical circuit that executes the control program, and a recording device such as an internal memory or an accessible external memory storing the control program. Three-dimensional model generation device 100 is an information processing device. The function of each processing unit of three-dimensional model generation device 100 may be realized by software, or may be realized by hardware.

Additionally, three-dimensional model generation device 100 may store the camera parameters in advance. In this case, three-dimensional model generation system 400 need not include estimation device 200. Additionally, imaging devices 301 may be communicatively connected to three-dimensional model generation device 100 wirelessly or with wires.

Additionally, frames shot with imaging devices 301 may be directly output to three-dimensional model generation device 100. In this case, imaging devices 301 may be directly connected to three-dimensional model generation device 100 by wired communication or wireless communication, or may be indirectly connected to three-dimensional model generation device 100 via a hub, such as a communication equipment or a server, which is not illustrated.

[Configuration of Three-Dimensional Model Generation Device]

Subsequently, referring to FIG. 2, the details of the configuration of three-dimensional model generation device 100 will be described.

Three-dimensional model generation device 100 is a device that generates a three-dimensional model from a plurality of frames. Three-dimensional model generation device 100 includes receiver 110, storage 120, obtainer 130, generator 140, and outputter 150.

Receiver 110 receives, from estimation device 200, frames shot with imaging devices 301, and the camera parameters estimated by estimation device 200. Accordingly, receiver 110 obtains a first frame (first image) of a subject shot from a first viewpoint, and a second frame (second image) of the subject shot from a second viewpoint. That is, the frames received by receiver 110 include the first frame and the second frame. Receiver 110 may obtain three-dimensional model 520 from estimation device 200. Receiver 110 outputs the received frames and camera parameters to storage 120. Receiver 110 is, for example, a communication interface for communicating with estimation device 200. When three-dimensional model generation device 100 and estimation device 200 perform wireless communication, receiver 110 includes, for example, an antenna and a wireless communication circuit. Alternatively, when three-dimensional model generation device 100 and estimation device 200 perform wired communication, receiver 110 includes, for example, a connector connected to a communication line, and a wired communication circuit. Note that receiver 110 may receive frames from imaging devices 301 without going through estimation device 200.

Storage 120 stores the plurality of frames and the camera parameters that are received by receiver 110. Storage 120 may store three-dimensional model 520 received by receiver 110. Note that storage 120 may store processing results of respective processing units included in three-dimensional model generation device 100. Storage 120 stores, for example, a control program executed by each processing unit included in three-dimensional model generation device 100. Storage 120 is realized by, for example, an HDD (Hard Disk Drive), flash memory, etc.

Obtainer 130 obtains, from storage 120, a plurality of frames, and the camera parameters of each imaging device 301, which are stored in storage 120, and outputs them to generator 140.

Note that three-dimensional model generation device 100 need not include storage 120 and obtainer 130. In this case, receiver 110 may output, to generator 140, the frames received from imaging devices 301, and the camera parameters of each imaging device 301 received from estimation device 200.

Generator 140 generates a three-dimensional model using a plurality of frames and a camera parameter. Generator 140 has searcher 141, calculator 142, and model generator 143.

Searcher 141 searches for a similar point that is similar to a first point in a first frame among the frames from a plurality of second points in a search area, which is based on the first point, in a second frame. Specifically, the first point is one first pixel among a plurality of first pixels forming the first frame. The search area is an area in second frames that is defined by an epipolar line corresponding to the first point in the first frame, and is an area formed by a plurality of second points on the epipolar line, for example. Specifically, the second points are second pixels included in the search area. Note that each of the first point and the second point may be or need not be a feature point.

Searcher 141 may search for a similar point (similar pixel) that is similar to each of the first pixels forming the first frame from the second pixels in the search area in the second frame. Searcher 141 may search for the similar point for each of a plurality of first pixels or for one first pixel. Searcher 141 may search for the similar point for each of a plurality of second frames. Searcher 141 may search for the similar point for each of a plurality of second frames or for one second frame.

Figure 3:
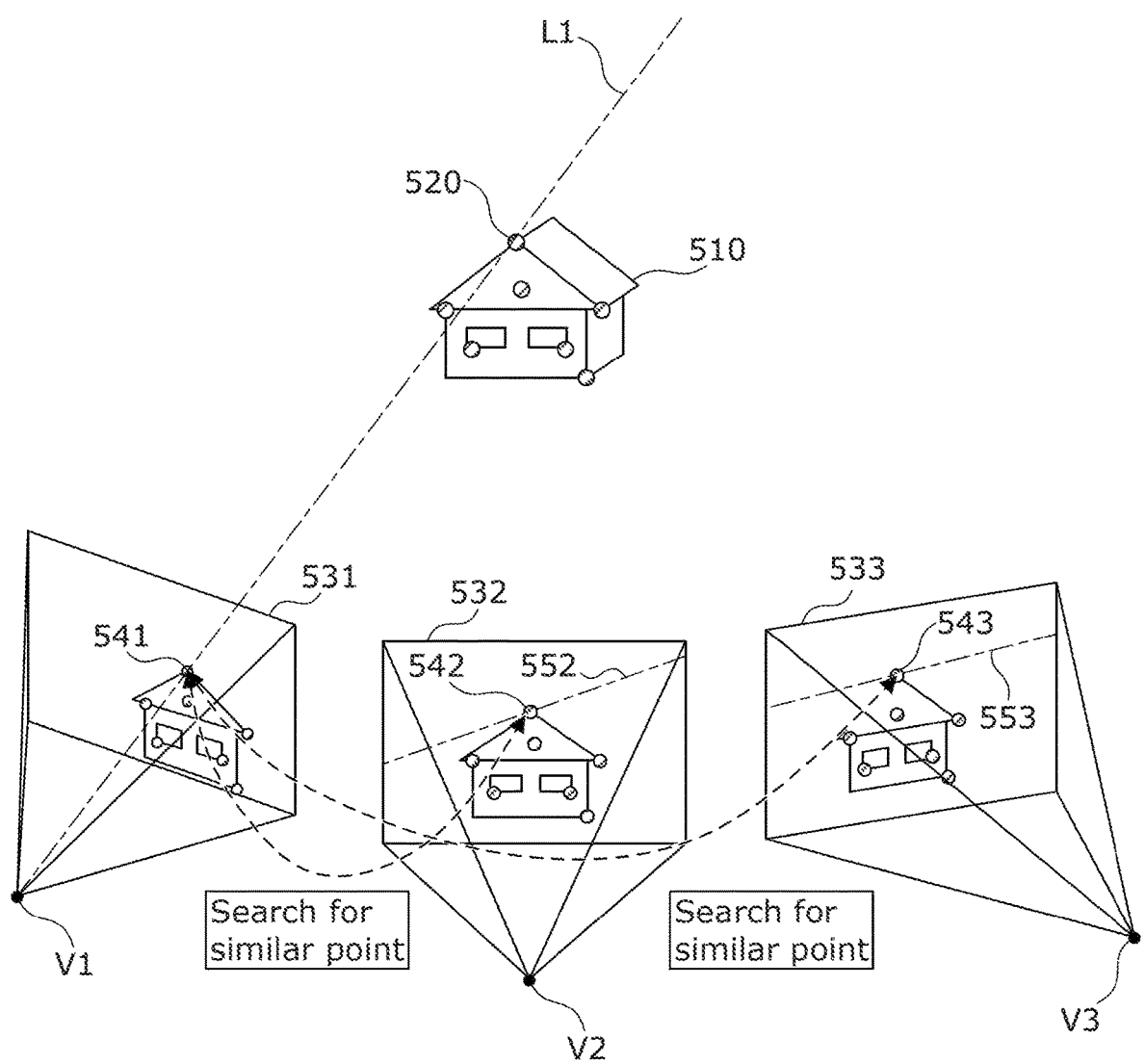
FIG. 3 is a diagram for describing search processing by a searcher.

FIG. 3 is a diagram for describing search processing by searcher 141. FIG. 3 illustrates an example in which imaging device 301 at first viewpoint V1 shoots first frame 531 containing subject 510, imaging device 301 at second viewpoint V2 shoots second frame 532 containing subject 510, and imaging device 301 at third viewpoint V3 shoots second frame 533 containing subject 510.

For each first pixel, searcher 141 calculates an epipolar line that is a straight line connecting the position of imaging device 301 having shot the first frame and the two-dimensional coordinates of the first pixel in the first frame projected onto the second frame to be processed. For example, as illustrated in FIG. 3, searcher 141 calculates epipolar line 552 that is straight line L1 connecting first viewpoint V1 and first pixel 541 projected onto second frame 532. Searcher 141 also calculates epipolar line 553 that is straight line L1 projected onto second frame 533. Searcher 141 then searches for a similar point that is similar to first pixel 541 to be processed in first frame 531 from epipolar lines 552 and 553 in second frames 532 and 533.

Calculator 142 calculates an accuracy of a search result using a degree of similarity between the first pixel and each of the second pixels in the search area. The accuracy of a search result corresponds to a certainty of a similar point (a second pixel similar to a first pixel) found in the search area, for example. The higher the accuracy of the search result, the higher the certainty of the similar point is. The certainty of the similar point is different from the degree of similarity of the similar point. For example, when there is a plurality of second pixels having high degrees of similarity in the search area, the certainties of the similar points are low even though the degrees of similarity are high.

As the degree of similarity, calculator 142 calculates N(I, J), which indicates a normalized cross correlation (NCC) between small areas of the first frame and the second frame to be processed, according to Equation 1. N(I, J) is expressed by a numerical value from −1 to 1, and indicates a higher degree of similarity as N(I, J) comes closer to 1.

[Math. 1]

$$N(I, J) = \frac{\sum (I_{xy} - \overline{I_{x,y}}) \cdot (J_{st} - \overline{J_{st}})}{\sqrt{(I_{xy} - \overline{I_{xy}})^2 (J_{st} - \overline{J_{st}})^2}} \quad \text{(Equation 1)}$$

$I_{xy}$ and $J_{xy}$ indicate a pixel value in a small area in each frame.

$\overline{I_{xy}}$ and $\overline{J_{xy}}$ indicate a pixel average in a small area in each frame.

Calculator 142 calculates a plurality of degrees of similarity, in order to calculate the degree of similarity between the first pixel and each of the second pixels in the search area. Calculator 142 calculates a first sum, which is a sum of degrees of similarity calculated for one search area according to Equation 2. The first sum corresponds to a first accuracy, which is an example of the accuracy of the search result. The smaller the first sum, the higher the first accuracy is. Calculator 142 searches for a similar point that is similar to the first pixel, and calculates the first accuracy for each of the second frames to be searched. The first accuracy indicates the accuracy of a search of a plurality of second pixels in a search area in a second frame to be processed for a similar point that is similar to the first pixel.

[Math. 2]

$$\text{Matching Score } (I, J) = \sum_{I=X}^{S} \sum_{J=Y}^{T} N_i(I, J) \quad \text{(Equation 2)}$$

Note that, in Equation 2, (I, J) indicates coordinates of a first pixel in a first frame. (X, Y) indicates coordinates of a starting point of an epipolar line in a second frame to be processed, and (S, T) indicates coordinates of an end point of the epipolar line in the second frame to be processed. i denotes a frame number for identifying a second frame to be referred to.

Note that the first sum in Equation 2 may include only N(I, J) that is greater than first threshold Th1.

Next, a specific example of calculation processing by calculator 142 will be described with reference to FIG. 4 to FIG. 8.

FIG. 4 is a diagram illustrating a relationship between subject 510 and frames 561 to 563. FIG. 4 illustrates an example where optical axes of imaging devices 301 having shot the subject are parallel to each other. Note that the example where the optical axes of imaging devices 301 are parallel to each other is illustrated for the convenience of explanation, and the present disclosure is not limited to the example where the optical axes of imaging devices 301 are parallel to each other.

Figure 5:
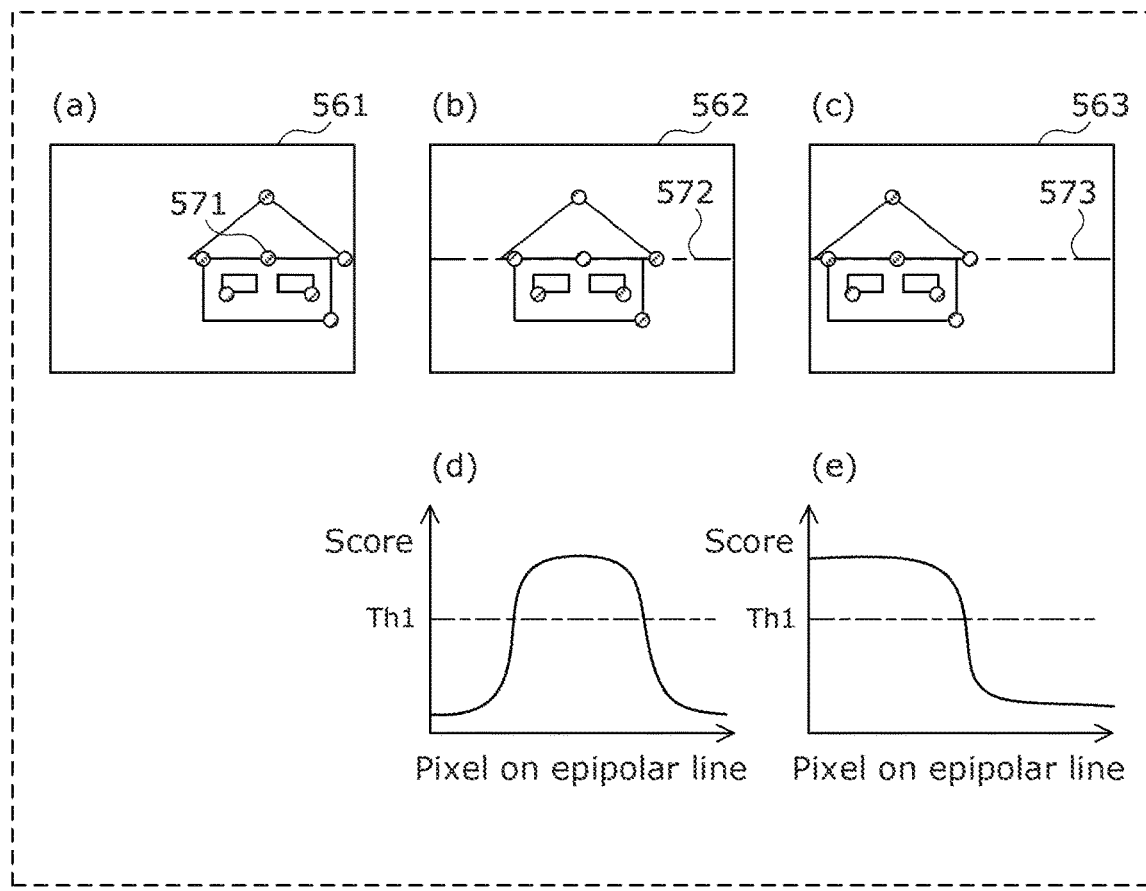
FIG. 5 is a diagram illustrating an example of a case where a first accuracy is lower than a predetermined accuracy.
Figure 6:
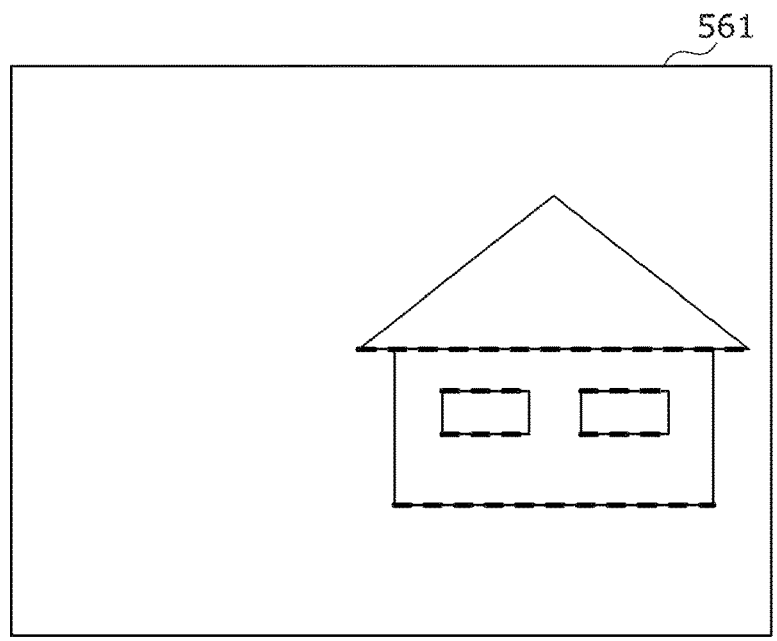
FIG. 6 is a diagram illustrating an edge for which a first accuracy tends to be lower than a predetermined accuracy in a first frame.

FIG. 5 is a diagram illustrating an example of a case where the first accuracy for first frame 561 is lower than a predetermined accuracy. That is, FIG. 5 illustrates an example of a case where the first sum calculated according to Equation 2 is greater than second threshold Th2 (not shown). When the first sum is greater than second threshold Th2, calculator 142 may determine that the accuracy of the search for a second pixel as a similar point to first pixel 571 is lower than the predetermined accuracy. This will be specifically described below.

Parts (a) to (c) of FIG. 5 illustrate first frame 561, second frame 562, and second frame 563, respectively. Part (d) of FIG. 5 is a graph illustrating a relationship between a plurality of second pixels on epipolar line 572 in second frame 562 to be searched for a pixel similar to first pixel 571 in first frame 561 and the degrees of similarity (matching scores) between first pixel 571 and the second pixels. The horizontal axis of the graph illustrated in part (d) of FIG. 5 indicates the position of the second pixel on the epipolar line, and the vertical axis indicates the score (degree of similarity) of the second pixel. Epipolar line 572 is a straight line connecting the position of imaging device 301 having shot first frame 561 and first pixel 571 (or a point in the subject in the three-dimensional space corresponding to first pixel 571) projected onto second frame 562. Part (e) of FIG. 5 is a graph illustrating a relationship between a plurality of second pixels on epipolar line 573 in second frame 563 to be searched for a pixel similar to first pixel 571 in first frame 561 and the degrees of similarity (matching scores) between first pixel 571 and the second pixels. Epipolar line 573 is a straight line connecting the position of imaging device 301 having shot first frame 561 and first pixel 571 (or a point in the subject in the three-dimensional space corresponding to first pixel 571) projected onto second frame 563. Note that, in parts (d) and (e) of FIG. 5, the degree of similarity (matching score) is shown simply as score.

As illustrated in parts (b) and (c) of FIG. 5, there are many pixels (a predetermined number of pixels or more, for example) similar to first pixel 571 on epipolar lines 572 and 573 associated with first pixel 571, and therefore, many second pixels (a predetermined number of second pixels or more, for example) having a matching score greater than first threshold Th1 are included. For example, when epipolar lines 572 and 573 extend along an edge in second frames 562 and 563, many second pixels having a matching score greater than first threshold Th1 tend to be included in epipolar lines 572 and 573. For example, when an edge indicated by a dashed line in FIG. 6 extends along an epipolar line, many second pixels (a predetermined number of second pixels or more, for example) having a matching score greater than first threshold Th1 tend to be included.

Calculator 142 may determine a second pixel having a matching score greater than first threshold Th1 to be a similar point that is similar to first pixel 571.

Although the horizontal axis of the graph illustrated in part (d) of FIG. 5 has been described as indicating the position of the second pixel for the sake of explanation, the position of the second pixel is not essential for calculation of the first sum.

Figure 7:
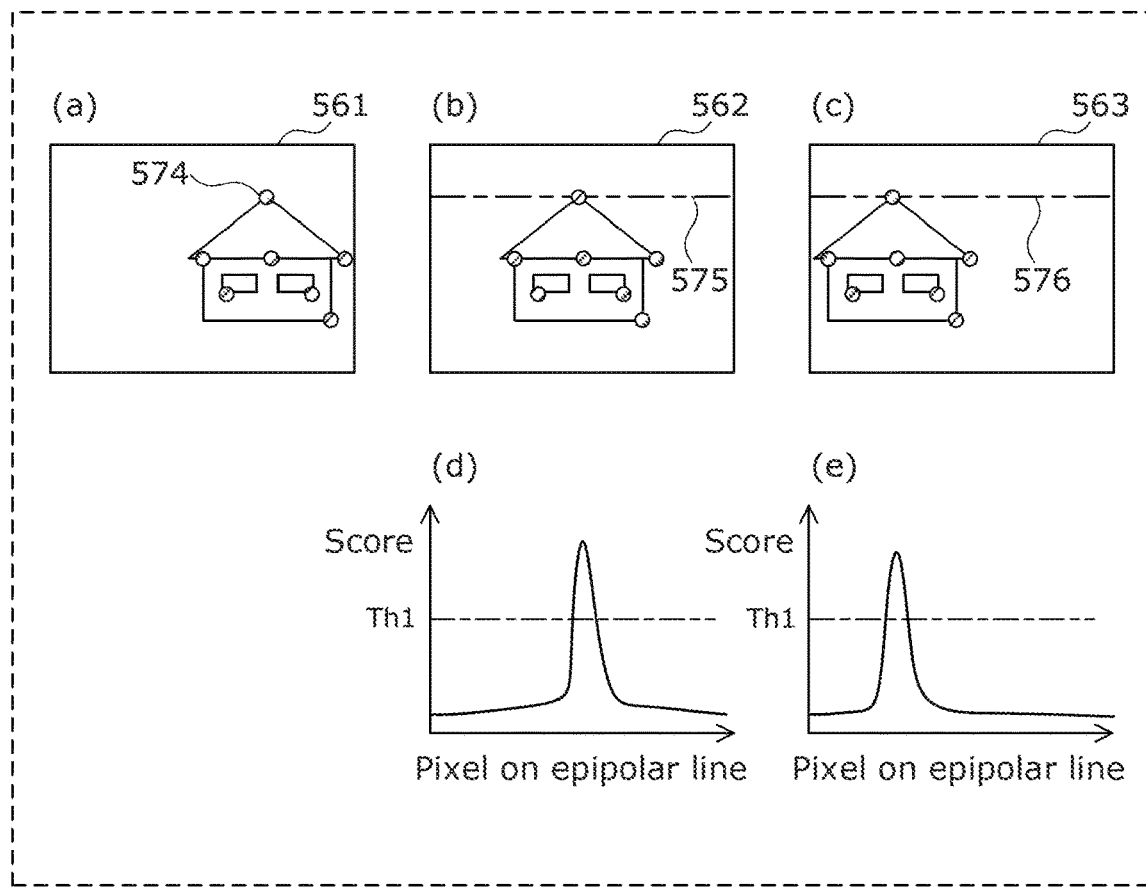
FIG. 7 is a diagram illustrating an example of a case where a first accuracy is higher than a predetermined accuracy.
Figure 8:
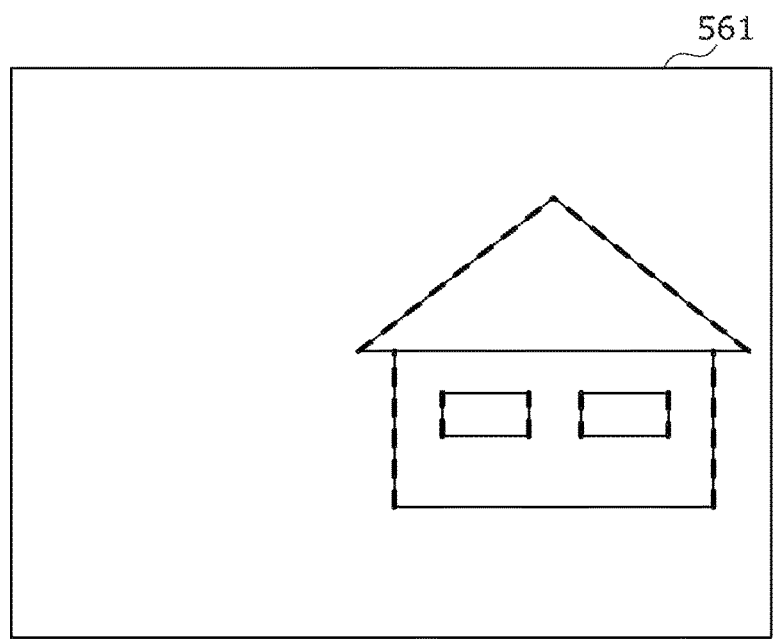
FIG. 8 is a diagram illustrating an edge for which a first accuracy tends to be higher than a predetermined accuracy in a first frame.

FIG. 7 is a diagram illustrating an example of a case where the first accuracy for first frame 561 is equal to or higher than the predetermined accuracy. That is, FIG. 7 illustrates an example of a case where the first sum calculated according to Equation 2 is equal to or smaller than second threshold Th2. When the first sum is equal to or smaller than second threshold Th2, calculator 142 may determine that the accuracy of the search for a second pixel as a similar point to first pixel 571 is equal to or higher than the predetermined accuracy. This will be specifically described below.

Parts (a) to (c) of FIG. 7 illustrate first frame 561, second frame 562, and second frame 563, respectively. Part (d) of FIG. 7 is a graph illustrating a relationship between a plurality of second pixels on epipolar line 575 in second frame 562 to be searched for a pixel similar to first pixel 574 in first frame 561 and the degrees of similarity (matching scores) between first pixel 574 and the second pixels. Epipolar line 575 is a straight line connecting the position of imaging device 301 having shot first frame 561 and first pixel 574 (or a point in the subject in the three-dimensional space corresponding to first pixel 574) projected onto second frame 562. Part (e) of FIG. 7 is a graph illustrating a relationship between a plurality of second pixels on epipolar line 576 in second frame 563 to be searched for a pixel similar to first pixel 574 in first frame 561 and the degrees of similarity (matching scores) between first pixel 574 and the second pixels. Epipolar line 576 is a straight line connecting the position of imaging device 301 having shot first frame 561 and first pixel 574 (or a point in the subject in the three-dimensional space corresponding to first pixel 574) projected onto second frame 563. Note that, in parts (d) and (e) of FIG. 7, the degree of similarity (matching score) is shown simply as score.

As illustrated in parts (b) and (c) of FIG. 7, there are a little pixels (less than a predetermined number of pixels, for example) similar to first pixel 574 on epipolar lines 575 and 576 associated with first pixel 574, and therefore, there are a little second pixels (less than a predetermined number of second pixels, for example) having a matching score greater than first threshold Th1. For example, when epipolar lines 575 and 576 intersect with an edge in second frames 562 and 563, the number of second pixels having a matching score greater than first threshold Th1 tends to be small. For example, when an edge indicated by a dashed line in FIG. 8 intersects with an epipolar line, the number of second pixels having a matching score greater than first threshold Th1 tend to be small (less than a predetermined number of second pixels, for example).

As described above with reference to FIG. 5 and FIG. 7, the greater the first sum, the greater the number of second pixels similar to the first pixel is, and therefore, the higher the possibility that a wrong second pixel is matched with the first pixel is. To the contrary, the smaller the first sum, the smaller the number of second pixels similar to the first pixel is, and therefore, the higher the possibility that an appropriate second pixel is matched with the first pixel is. Therefore, the first sum can be used as an index of accuracy: the greater the value of the first sum, the lower the accuracy of the search is.

The first accuracy may be an inverse of the first sum or a predetermined fixed value minus the first sum.

Even when the first sum is equal to or smaller than second threshold Th2, calculator 142 may determine the accuracy of the search is lower than the predetermined accuracy if there is no second pixel having a matching score greater than first threshold Th1. This is because there is no similar point that is similar to the first pixel on the epipolar line.

Referring back to FIG. 2, calculator 142 calculates the first sum for each of the second frames. Therefore, a plurality of first sums is obtained for one first pixel. Calculator 142 calculates a second sum, which is a sum of the first sums obtained for one first pixel, according to Equation 3. The second sum corresponds to a second accuracy, which is an example of the accuracy of the search result. The second accuracy indicates the accuracy of a search of a plurality of second frames for similar points that are similar to a plurality of first pixels to be processed.

[Math. 3]

$$\text{Total Matching Score}(I, J) = \sum_{i=0}^{n} \sum_{I=X}^{S} \sum_{J=Y}^{T} N_i(I, J) \quad \text{(Equation 3)}$$

n denotes the number of a plurality of second frames to be referred to.

Calculator 142 calculates a plurality of first sums for each of the first pixels in the first frame. Calculator 142 then calculates a second sum from the first sums. The second sum can be used as an index of the second accuracy: the greater the value of the second sum, the lower the second accuracy is.

The second accuracy may be an inverse of the second sum or a predetermined fixed value minus the second sum.

When the first sum obtained according to Equation 2 is 0, the first sum need not be included in the calculation of the second sum according to Equation 3.

Model generator 143 generates a three-dimensional model using the search result from searcher 141 and the accuracy calculated by calculator 142. Specifically, model generator 143 generates a three-dimensional model using a plurality of first search results, which are results of searches performed for a plurality of second frames, and a plurality of first accuracies. For each of a plurality of first pixels, model generator 143 generates a three-dimensional model including a plurality of three-dimensional points that is obtained by generating three-dimensional points using a plurality of first search results and a plurality of first accuracies.

Figure 9:
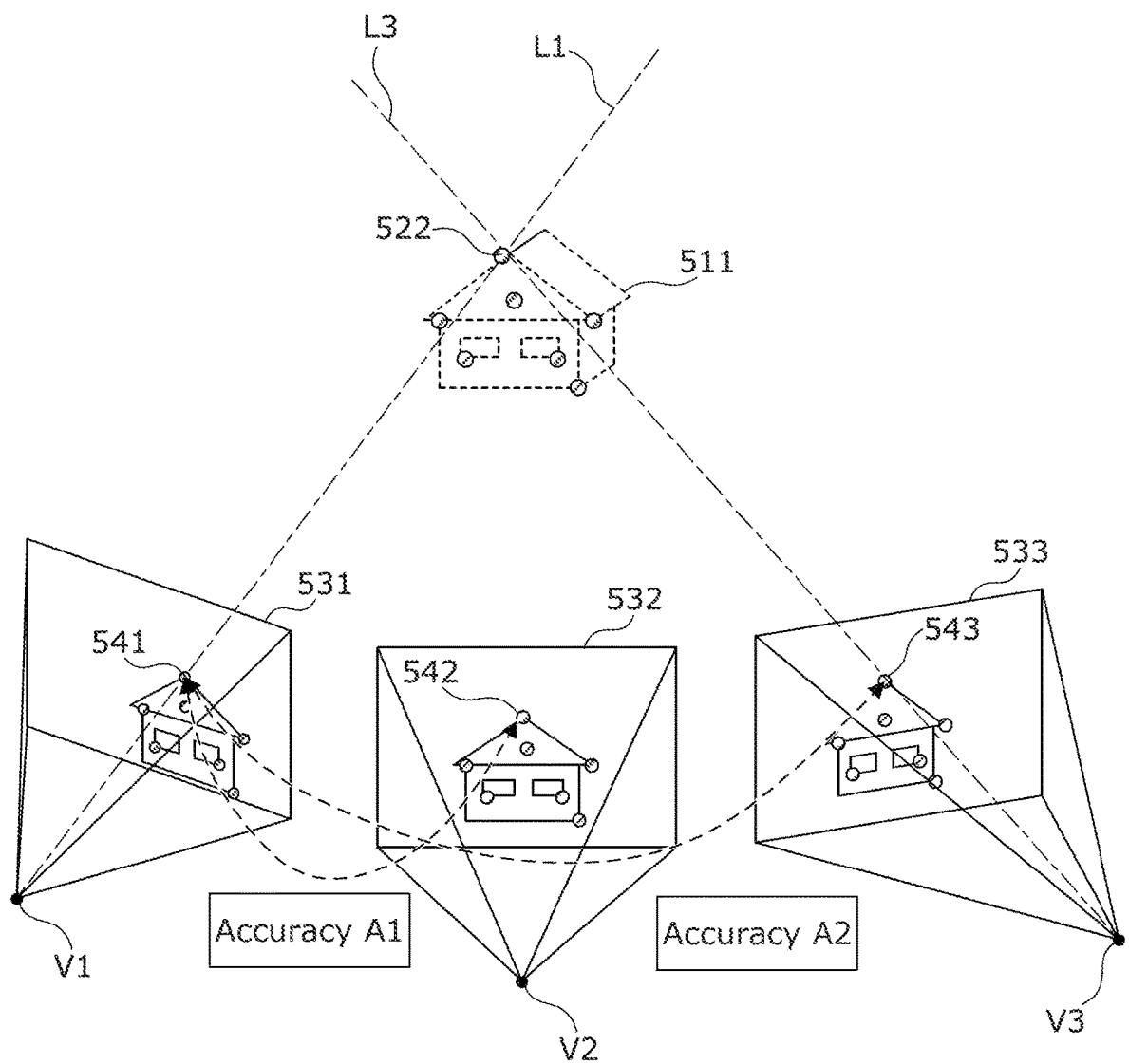
FIG. 9 is a diagram for describing a first example of three-dimensional model generation processing.

FIG. 9 is a diagram for describing a first example of three-dimensional model generation processing.

For example, model generator 143 may generate a three-dimensional model without using a first search result for a second frame for which the first sum indicating the first accuracy calculated is greater than second threshold Th2, that is, the first accuracy is lower than the predetermined accuracy. As illustrated in FIG. 9, model generator 143 generates three-dimensional point 522 using a first search result for second frame 533 having accuracy A2 (a first sum calculated for second frame 533) equal to or smaller than second threshold Th2, without using a first search result for second frame 532 having accuracy A1 (a first sum calculated for second frame 532) greater than second threshold Th2. In this way, model generator 143 calculates, based on the principle of triangulation, three-dimensional point 522 indicated by three-dimensional coordinates on subject 510 using sets of the first pixel and a different one of a plurality of second pixels selected as similar points based on first search results excluding any first search result for which the accuracy is determined to be low. For example, as illustrated in FIG. 9, model generator 143 generates, as three-dimensional point 522, an intersection point between straight line L1 connecting first viewpoint V1 and first pixel 541 and straight line L3 connecting third viewpoint V3 and second pixel 543.

Alternatively, for example, model generator 143 may selects N second frames from the second frames in descending order of the calculated first accuracy (N denotes an integer equal to or greater than 1), and generate a three-dimensional model using N first search results corresponding to the selected N second frames. Model generator 143 calculates, based on the principle of triangulation, a three-dimensional point indicated by three-dimensional coordinates on subject 510 using sets of the first pixel and a different one of a plurality of second pixels selected as similar points using N first search results selected in descending order of accuracy.

When a plurality of three-dimensional points is calculated for one first pixel, model generator 143 may generate one three-dimensional point corresponding to the one first pixel by calculating an average of the three-dimensional points. Second threshold Th2 is an example of the predetermined accuracy. In this way, since any first search result having an accuracy greater than second threshold Th2 is not used for the three-dimensional model generation processing, a three-dimensional point can be generated with higher accuracy.

In these two examples in the first example, N first search results having higher accuracies are preferentially used for the three-dimensional model generation processing, and therefore, a three-dimensional point can be generated with higher accuracy.

Figure 10:
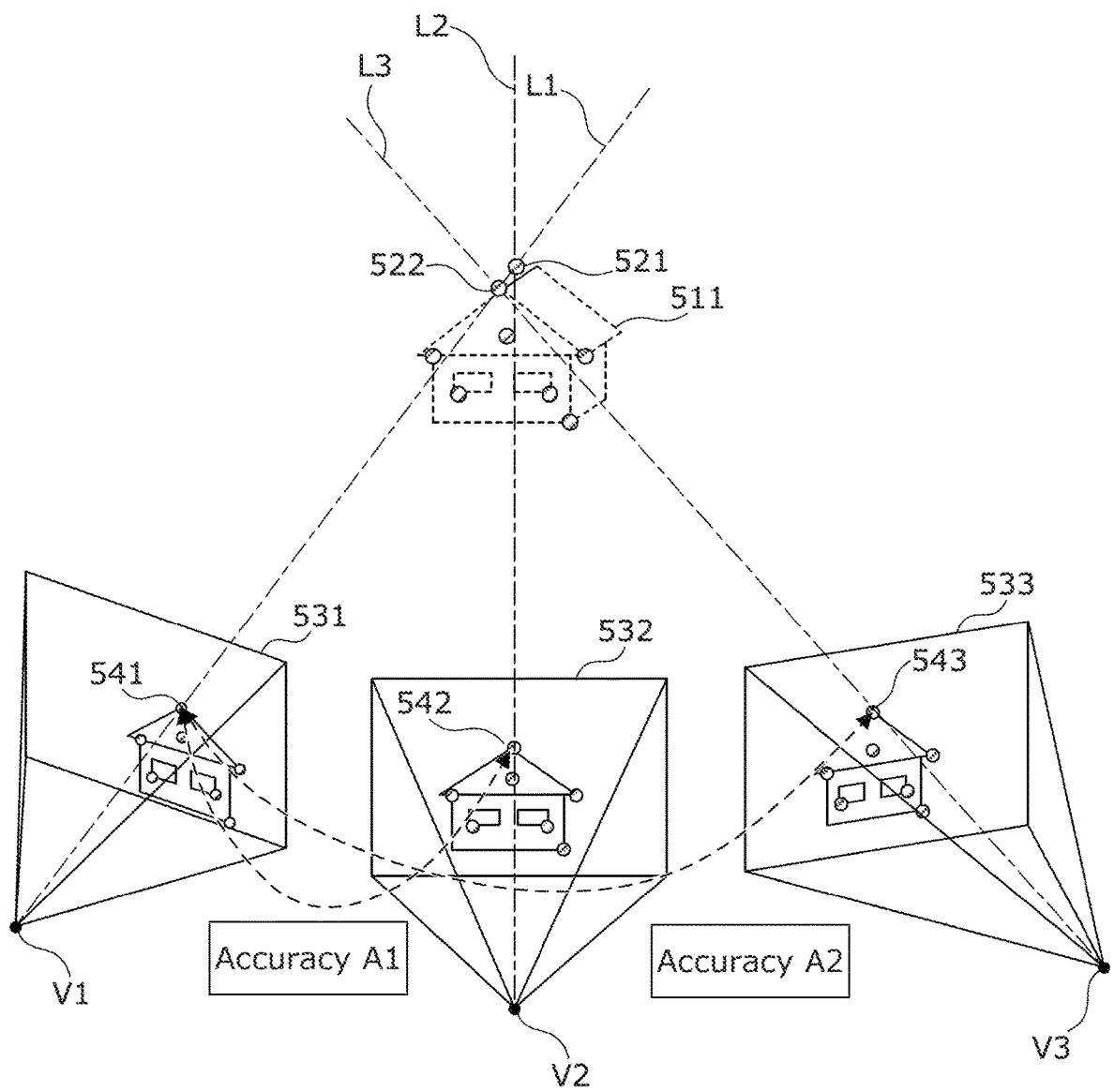
FIG. 10 is a diagram for describing a second example of three-dimensional model generation processing.

FIG. 10 is a diagram for describing a second example of the three-dimensional model generation processing.

For example, based on a plurality of first search results, model generator 143 generates a plurality of three-dimensional points each corresponding to a different one of the first search results. Specifically, model generator 143 determines a set of a first pixel and a second pixel similar to the first pixel for each of a plurality of second frames. Model generator 143 generates a plurality of three-dimensional points by generating one three-dimensional point from one set. Model generator 143 may generate an integrated three-dimensional point by weighted averaging of the three-dimensional points in which a greater weight is given to a three-dimensional point having a first search result with a higher first accuracy, and generate a three-dimensional model including the integrated three-dimensional point generated. While first search results with higher accuracies are preferentially used in the first example described above, in the second example, as illustrated in FIG. 10, three-dimensional points 521 and 522 indicated by three-dimensional coordinates on subject 510 are calculated based on the principle of triangulation using sets of first pixel 541 and a different one of second pixels 542 and 543 selected as similar points based on all the first search results. For example, as illustrated in FIG. 10, model generator 143 generates, as three-dimensional point 521, an intersection point between straight line L1 connecting first viewpoint V1 and first pixel 541 and straight line L2 connecting second viewpoint V2 and second pixel 542, and generates, as three-dimensional point 522, an intersection point between straight line L1 and straight line L3 connecting third viewpoint V3 and second pixel 543. In the generation of the three-dimensional model, an integrated three-dimensional point is generated by weighted averaging of three-dimensional points 521 and 522 each generated using a plurality of first search results in which a greater weight is given to a three-dimensional point having a higher first accuracy. Therefore, a plurality of three-dimensional points can be integrated in such a manner that many three-dimensional points having high accuracies are included as constituents, and three-dimensional points can be generated with higher accuracy.

Model generator 143 may generate a three-dimensional model including a plurality of three-dimensional points and a plurality of second accuracies each corresponding to a different one of the three-dimensional points. Therefore, each of the three-dimensional points included in the three-dimensional model can be associated with a second accuracy that is based on a plurality of first accuracies of a plurality of search results used when generating the three-dimensional point.

Therefore, model generator 143 can filters (smooth) the three-dimensional model using the second accuracy as a weight, for example. Specifically, model generator 143 may correct at least one low-accuracy three-dimensional point located between two high-accuracy three-dimensional points with respect to the two high-accuracy three-dimensional points, the at least one low-accuracy three-dimensional point being associated with a second accuracy equal to or lower than a predetermined accuracy, and the two high-accuracy three-dimensional points each being associated with a second accuracy higher than the predetermined accuracy. In that case, low-accuracy three-dimensional points can be corrected with respect to high-accuracy three-dimensional points by permitting a greater displacement for correction for a three-dimensional point with a lower accuracy, for example, and therefore, the accuracy of generation of the three-dimensional model can be improved.

[Operation of Three-Dimensional Model Generation Device]

Figure 11:
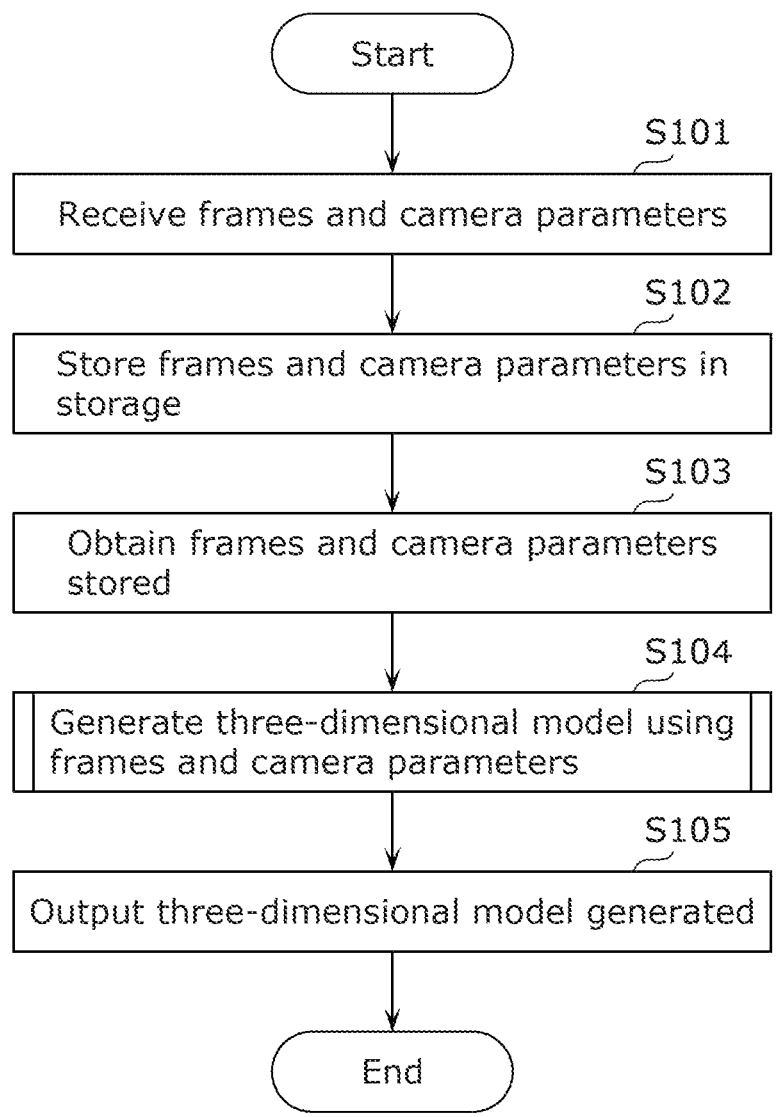
FIG. 11 is a flowchart illustrating an example of the operation of a three-dimensional model generation device.

Next, an operation of three-dimensional model generation device 100 will be described with reference to FIG. 11. FIG. 11 is a flowchart illustrating an example of the operation of three-dimensional model generation device 100.

In three-dimensional model generation device 100, first, receiver 110 receives, from estimation device 200, a plurality of frames shot by a plurality of imaging devices 301 and a camera parameter of each imaging device 301 (S101). Step S101 is an example of a step of obtaining a plurality of images. Receiver 110 need not receive the frames and the camera parameters at one timing, and may receive the frames and the camera parameters at different timings. That is, the obtaining of the frames and the obtaining of the camera parameters may be performed at the same timing or at different timings.

Storage 120 then stores the frames shot by imaging devices 301 and the camera parameter of each imaging device 301 received by receiver 110 (S102).

Obtainer 130 then obtains the frames and the camera parameters stored in storage 120, and outputs the frames and camera parameters obtained to generator 140 (S103).

Generator 140 then generates a three-dimensional model using the frames and the camera parameters (S104). Details of step S104 of generating a three-dimensional model will be described later with reference to FIG. 12.

Outputter 150 then outputs the three-dimensional model generated by generator 140 (S105).

Figure 12:
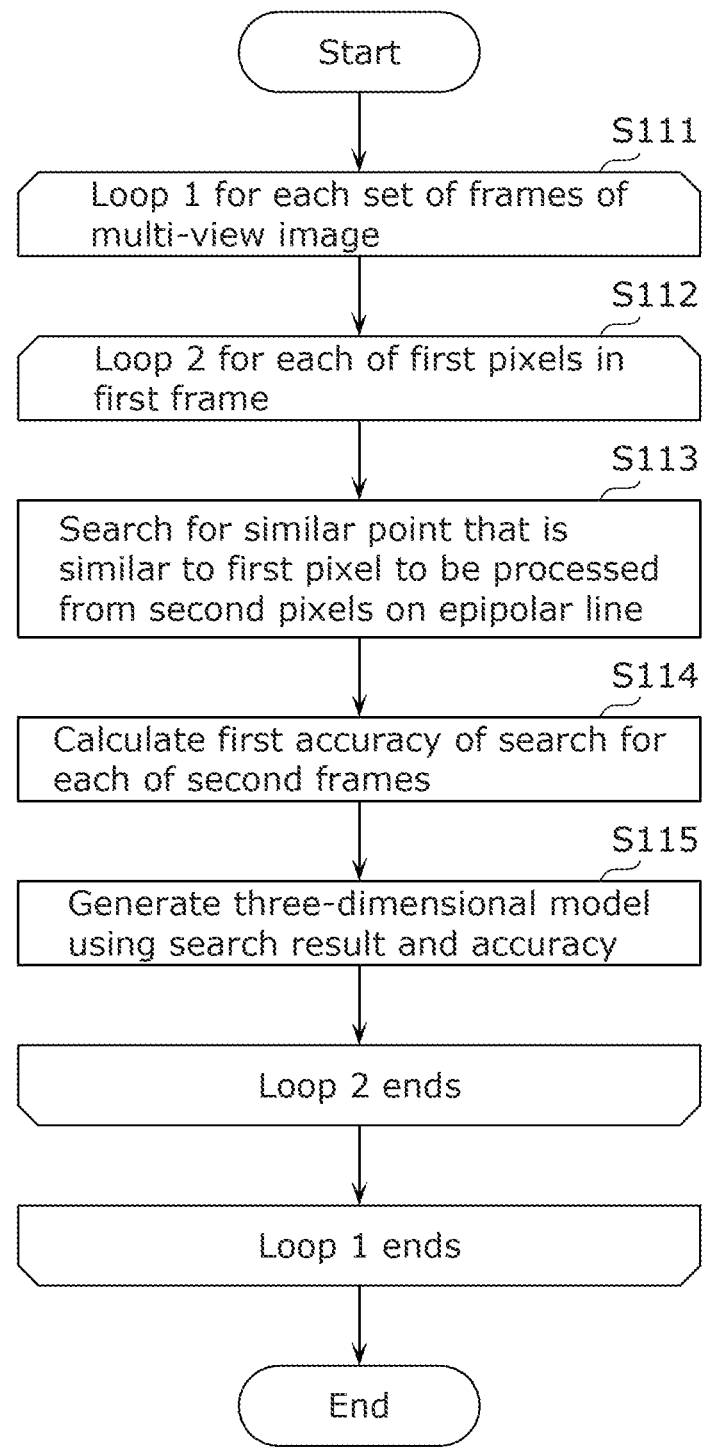
FIG. 12 is a flowchart illustrating an example of details of the generation processing in step S104 by a generator.

FIG. 12 is a flowchart illustrating an example of details of the generation processing in step S104 by generator 140.

Generator 140 performs loop 1 for each set of frames of a multi-view image shot at a corresponding timing (S111). In loop 1, loop 2 is performed for each set of frames.

Generator 140 performs loop 2 for each first pixel in a first frame of a set of frames to be processed (S112). In loop 2, a process from step S113 to step S115 is performed for each first pixel.

For a first pixel to be processed, searcher 141 searches for a similar point that is similar to the first pixel from a plurality of second pixels on an epipolar line associated with the first pixel in a plurality of second frames of the set of frames to be processed (S113). Details of step S113 has already been described in the description of searcher 141, and therefore descriptions thereof will be omitted.

Calculator 142 calculates a first accuracy of the search for a similar point that is similar to the first pixel to be processed, for each of the second frames (S114). Details of step S114 has already been described in the description of calculator 142, and therefore descriptions thereof will be omitted.

Model generator 143 generates a three-dimensional model using the first search results obtained in step S113 and the first accuracies obtained in step S114 (S115). Details of step S115 has already been described in the description of model generator 143, and therefore descriptions thereof will be omitted.

Loop 2 ends when the process from step S113 to step S115 ends for all the first pixels included in the first frame of the set of frames to be processed.

Loop 1 ends when loop 2 ends for all the sets of frames.

(Advantageous Effects, etc.)

A three-dimensional model generation method according to the present embodiment is a three-dimensional model generation method executed by an information processing device, and includes: obtaining frames generated by shooting a subject from a plurality of viewpoints (S101); searching for a similar point that is similar to a first pixel in a first frame among the frames, from second pixels in a search area in a second frame different from the first frame, the search area being based on the first pixel (S113); calculating an accuracy of a search result, using degrees of similarity each between the first pixel and a different one of the second pixels (S114); and generating a three-dimensional model using the search result and the accuracy (S115).

According to this method, since the three-dimensional model is generated using search results and accuracies of the search results, the accuracy of generation of the three-dimensional model can be improved by avoiding using search results with lower accuracies or by preferentially using search results with higher accuracies for generating the three-dimensional model, for example.

Furthermore, in the three-dimensional model generation method according to the present embodiment, in the searching (S113), the similar point is searched for in each of second frames each of which is the second frame. In the calculating of the accuracy (S114), a first accuracy is calculated for each of first search results corresponding to a different one of the second frames. In the generating of the three-dimensional model of the subject (S115), the three-dimensional model is generated using the first search results and the first accuracies.

According to this method, since the three-dimensional model is generated using a plurality of first search results and a plurality of first accuracies, three-dimensional points with higher accuracies can be generated by avoiding using first search results with lower accuracies or by preferentially using first search results with higher accuracies for generating the three-dimensional model, for example. Therefore, the accuracy of generation of the three-dimensional model can be improved.

Furthermore, in the three-dimensional model generation method according to the present embodiment, in the generating of the three-dimensional model (S115), the three-dimensional model may be generated without using the first search result for a second frame for which the accuracy calculated is lower than a predetermined accuracy. According to this method, since a first search result with an accuracy lower than the predetermined threshold is not used for generating the three-dimensional model, three-dimensional points with higher accuracies can be generated.

Furthermore, in the three-dimensional model generation method according to the present embodiment, the generating of the three-dimensional model (S115) may include: selecting, from among the second frames, N second frames in a descending order of the first accuracy calculated (where N is an integer greater than or equal to 1); and generating the three-dimensional model using N first search results corresponding to the N second frames selected. According to this method, since N first search results with higher accuracies are preferentially used for generating the three-dimensional model, three-dimensional points with higher accuracies can be generated.

Furthermore, in the three-dimensional model generation method according to the present embodiment, the generating of the three-dimensional model (S115) includes: generating, based on the first search results, three-dimensional points each of which corresponds to a different one of the first search results; generating an integrated three-dimensional point by weighted averaging of the three-dimensional points in which a greater weight is given to a three-dimensional point having a corresponding first search result with a higher first accuracy; and generating the three-dimensional model including the integrated three-dimensional point generated. According to this method, since an integrated three-dimensional point is generated by weighted averaging of three-dimensional points generated using the first search results in which a greater weight is given to a three-dimensional point with a higher accuracy, three-dimensional points with higher accuracies can be generated.

Furthermore, in the three-dimensional model generation method according to the present embodiment, the searching (S113) is performed for each of first pixels each of which is the first pixel, in the calculating of the accuracy (S114), the first accuracies are calculated for each of the first pixels, and in the generating of the three-dimensional model (S115), a three-dimensional model including three-dimensional points obtained by generating, for each of the first pixels, a three-dimensional point using the first search results and the first accuracies is generated as the three-dimensional model. Therefore, a three-dimensional point with a higher accuracy can be generated for each of the first pixels. Therefore, the accuracy of generation of the three-dimensional model can be improved.

Furthermore, in the three-dimensional model generation method according to the present embodiment, the calculating of the accuracy (S114) includes calculating, for each of the first pixels, a sum of values (i.e., matching scores) indicating the first accuracies calculated for the first pixel, as a second accuracy of a search result based on the first pixel. In the generating of the three-dimensional model (S115), a three-dimensional model including the three-dimensional points and the second accuracies is generated as the three-dimensional model. Therefore, each of the three-dimensional points included in the three-dimensional model can be associated with a second accuracy that is based on the first accuracies of the search results used when generating the three-dimensional point.

Furthermore, in the three-dimensional model generation method according to the present embodiment, the generating of the three-dimensional model (S115) includes: correcting at least one low-accuracy three-dimensional point located between two high-accuracy three-dimensional points using the two high-accuracy three-dimensional points as reference, the at least one low-accuracy three-dimensional point being associated with a second accuracy lower than a predetermined accuracy, the two high-accuracy three-dimensional points each being associated with a second accuracy higher than the predetermined accuracy. According to this method, low-accuracy three-dimensional points can be corrected with respect to high-accuracy three-dimensional points by permitting a greater displacement for correction for a three-dimensional point with a lower accuracy, for example, and therefore, the accuracy of generation of the three-dimensional model can be improved.

Furthermore, in the three-dimensional model generation method according to the present embodiment, the search area is an area defined by second pixels on an epipolar line corresponding to the first pixel. Therefore, a candidate for a pixel similar to the first pixel can be efficiently selected from among the second pixels.

(Variation 1)

In the three-dimensional model generation method according to the embodiment described above, a three-dimensional model of a subject is generated by calculating an accuracy of a search result, the calculation of an accuracy of a search result may be omitted.

For example, a three-dimensional model generation method according to Variation 1 is performed by an information processing device. According to the three-dimensional model generation method according to Variation 1, a first image obtained by shooting a subject from a first viewpoint and a second image obtained by shooting the subject from a second viewpoint are obtained, a search area in the second image is determined based on a first point in the first image in order to search for a similar point that is similar to the first point, the similar point is searched for in the search area by calculating a degree of similarity indicating the degree of similarity between the first point and each of a plurality of second points in the search area, and a three-dimensional model of the subject is generated based on a result of the search and a variation of the degrees of similarity calculated.

For example, the degrees of similarity in the graph illustrated in part (d) of FIG. 7 is more locally distributed than the degrees of similarity in the graph illustrated in part (d) of FIG. 5. In other words, the degrees of similarity in the graph illustrated in part (d) of FIG. 7 has a greater variation and a greater standard deviation than the degrees of similarity in the graph illustrated in part (d) of FIG. 5. Calculator 142 calculates a standard deviation of the degrees of similarity, for example. When the calculated standard deviation is equal to or greater than a predetermined threshold, and the highest degree of similarity is equal to or higher than a predetermined threshold, model generator 143 uses the second pixel (similar point) having the highest degree of similarity for generating the three-dimensional model. When the calculated standard deviation is smaller than the predetermined threshold, model generator 143 does not use the second pixel having the highest degree of similarity for generating the three-dimensional model. Note that the index of a variation of degrees of similarity is not limited to the standard deviation.

(Other variations)

Although NCC is calculated as the degree of similarity (matching score) in the three-dimensional model generation methods according to the embodiment described above and Variation 1, the present disclosure is not limited to this. For example, as the degree of similarity, SSD(I, J) indicating a sum of squared differences (SSD) between pixel values of small areas of a first frame and a second frame to be processed may be calculated according to Equation 4. The smaller the value of SSD(I, J), the higher degree of similarity SSD(I, J) indicates.

[Math. 4]

$$SSD(I,J)=\Sigma(I_{xy}-J_{st})^2 \qquad \text{(Equation 4)}$$

$I_{xy}$ and $J_{st}$ indicate a pixel value in a small area in each frame.

Figure 13:
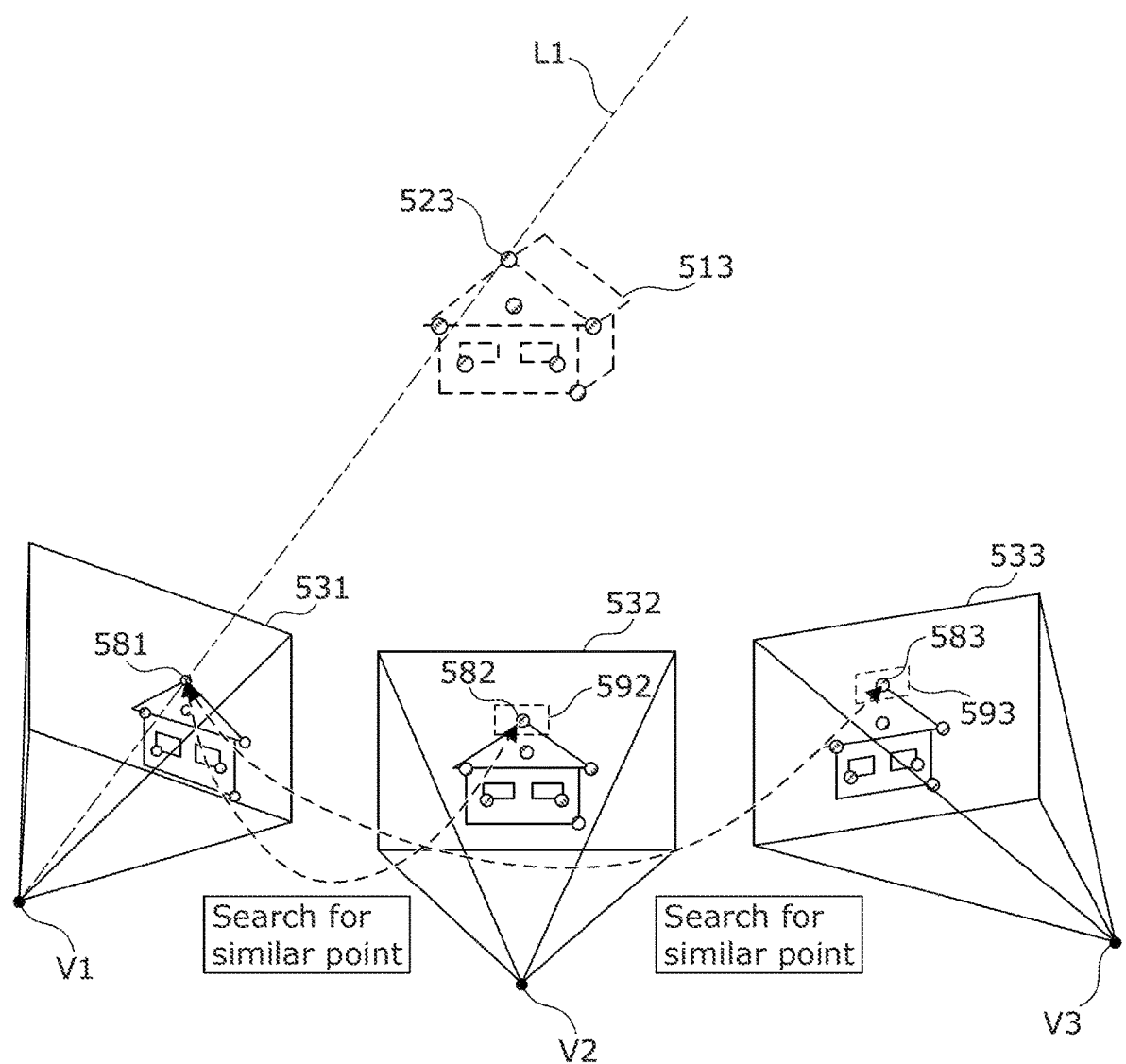
FIG. 13 is a diagram for describing search processing by a searcher in a variation.

Although the search area is an area in a plurality of second frames that is defined by an epipolar line corresponding to a first point (first pixel) in a first frame in the three-dimensional model generation methods according to the embodiment described above and Variation 1, the present disclosure is not limited to this. For example, as illustrated in FIG. 13, searcher 141 determines third pixels 582 and 583 in second frames 532 and 533 corresponding to first pixel 581 in first frame 531 based on a relationship between the position and posture of imaging device 301 having shot each of second frames 532 and 533 and known three-dimensional model 513 (a three-dimensional point cloud) obtained in advance. Searcher 141 then may determine, as search areas 592 and 593, areas including third pixels 582 and 583 with respect to third pixels 582 and 583. For example, searcher 141 may determine rectangular areas centered on third pixels 582 and 583, respectively, as search areas 592 and 593. The search area is not limited to a rectangular area and may be an area having a square, circular, or other particular shape. Note that known three-dimensional model 513 obtained in advance may be three-dimensional model 520 generated by estimation device 200 described above with reference to FIG. 3.

Although the three-dimensional model generation method, etc., according to the present disclosure has been described based on the embodiments described above, the present disclosure is not limited to the foregoing embodiments.

For example, in the foregoing embodiments and variations, each of the processing units included in the three-dimensional model generation device is described as being implemented by a CPU and a control program. For example, each of the structural components of these processing units may be configured of one or more electronic circuits. Each of the one or more electronic circuits may be a general-purpose circuit or a dedicated circuit. The one or more electronic circuits may include, for example, a semiconductor device, an integrated circuit (IC), or a large-scale integration (LSI), etc. The IC or LSI may be integrated in a single chip or several chips. Although referred to here as IC or LSI, the name may change depending on the scale of integration, and may be referred to as a system LSI, very large scale integration (VLSI), or ultra large scale integration (ULSI). Furthermore, a field programmable gate array (FPGA) that can be programmed after manufacturing of the LSI may be used for the same purpose.

Furthermore, general or specific aspects of the present disclosure may be implemented as a system, an apparatus, a method, an integrated circuit, or a computer program. Alternatively, the general or specific aspects of the present disclosure may be implemented as a non-transitory computer-readable recording medium, such as an optical disc, a hard disk drive (HDD), or a semiconductor memory, on which the computer program is recorded. Furthermore, the general or specific aspects of the present disclosure may be implemented as any combination of a system, an apparatus, a method, an integrated circuit, a computer program, and a recording medium.

The present disclosure also includes forms obtained by making various modifications to the above embodiments that can be conceived by those skilled in the art, as well as forms realized by combining structural components and functions in the embodiments, without departing from the essence of the present disclosure.

INDUSTRIAL APPLICABILITY

The present disclosure can be applied to a three-dimensional model generation device or a three-dimensional model generation system, and can be applied to, for example, figure creation, topography or building structure recognition, human activity recognition, free-viewpoint video generation, or the like.

The invention claimed is:

1. A three-dimensional model generation method executed by an information processing device, the three-dimensional model generation method comprising:
    obtaining images generated by shooting a subject from respective viewpoints;
    searching for a similar point that is similar to a first point in a first image among the images, from second points in a search area in a second image different from the first image, the search area being provided based on the first point;
    calculating an accuracy of a search result of the searching, using (i) a first degree of similarity between the first point and a second point selected as the similar point from among the second points in the searching and (ii) a second degree of similarity between the first point and an other second point not selected as the similar point from among the second points in the searching; and
    generating a three-dimensional model of the subject using the search result and the accuracy.

2. The three-dimensional model generation method according to claim 1, wherein
    in the calculating of the accuracy, the accuracy of the search result is calculated based on a sum of degrees of similarity obtained by calculating degrees of similarity between the first point and the respective second points.

3. The three-dimensional model generation method according to claim 1, wherein
    in the searching, the similar point is searched for in each of second images, each of the second images being the second image,
    in the calculating of the accuracy, a first accuracy is calculated for each of first search results corresponding to a different one of the second images, and
    in the generating of the three-dimensional model, the three-dimensional model is generated using the first search results and the first accuracies.

4. The three-dimensional model generation method according to claim 3, wherein
    in the generating of the three-dimensional model, the three-dimensional model is generated without using the first search result for a second image for which the first accuracy calculated is lower than a predetermined accuracy.

5. The three-dimensional model generation method according to claim 3, wherein
    the generating of the three-dimensional model includes:
        selecting, from among the second images, N second images in a descending order of the first accuracy calculated (where N is an integer greater than or equal to 1); and
        generating the three-dimensional model using N first search results corresponding to the N second images selected.

6. The three-dimensional model generation method according to claim 3, wherein
    the generating of the three-dimensional model includes:
        generating, based on the first search results, three-dimensional points each of which corresponds to a different one of the first search results;
        generating an integrated three-dimensional point by weighted averaging of the three-dimensional points in which a greater weight is given to a three-dimensional point having a corresponding first search result with a higher first accuracy; and
        generating the three-dimensional model including the integrated three-dimensional point generated.

7. The three-dimensional model generation method according to claim 3, wherein
    the searching is performed for each of first points, each of the first points being the first point,
    in the calculating of the accuracy, the first accuracies are calculated for each of the first points, and
    in the generating of the three-dimensional model, a three-dimensional model including three-dimensional points obtained by generating, for each of the first points, a three-dimensional point using the first search results and the first accuracies is generated as the three-dimensional model.

8. The three-dimensional model generation method according to claim 7, wherein
    the calculating of the accuracy includes calculating, for each of the first points, a sum of values indicating the first accuracies calculated for the first point, as a second accuracy of a search result based on the first point, and
    in the generating of the three-dimensional model, a three-dimensional model including the three-dimensional points and the second accuracies corresponding to the three-dimensional points is generated as the three-dimensional model.

9. The three-dimensional model generation method according to claim 8, wherein
    the generating of the three-dimensional model includes:
        correcting at least one low-accuracy three-dimensional point located between two high-accuracy three-dimensional points using the two high-accuracy three-dimensional points as reference, the at least one low-accuracy three-dimensional point being associated with a second accuracy lower than a predetermined accuracy, the two high-accuracy three-dimensional points each being associated with a second accuracy higher than the predetermined accuracy.

10. The three-dimensional model generation method according to claim 1, wherein
    the search area is an area defined by pixels on an epipolar line corresponding to the first point.

11. A three-dimensional model generation device comprising:
 memory; and
 a processor, wherein
 using the memory, the processor:
  obtains images generated by shooting a subject from respective viewpoints;
  searches for a similar point that is similar to a first point in a first image among the images, from second points in a search area in a second image different from the first image, the search area being provided based on the first point;
  calculates an accuracy of a three-dimensional point generated based on the first point, using (i) a first degree of similarity between the first point and a second point selected as the similar point from among the second points and (ii) a second degree of similarity between the first point and an other second point not selected as the similar point from among the second points; and
  generates a three-dimensional model of the subject using a result of the search and the accuracy.

12. A three-dimensional model generation method executed by an information processing device, the three-dimensional model generation method comprising:
 obtaining a first image and a second image, the first image being generated by shooting a subject from a first viewpoint, the second image being generated by shooting the subject from a second viewpoint;
 specifying a search area in the second image for searching for a similar point that is similar to a first point in the first image, based on the first point;
 searching for the similar point in the search area by calculating degrees of similarity each indicating a degree of similarity between respective second points and the first point; and
 generating a three-dimensional model of the subject based on a result of the searching and a variation in the degrees of similarity calculated,
 wherein the degrees of similarity include a first degree of similarity between the first point and a second point selected as the similar point from among the second points in the searching, and a second degree of similarity between the first point and other second points not selected as the similar point from among the second points in the searching.

* * * * *